United States Patent
Hennick et al.

(10) Patent No.: US 6,275,388 B1
(45) Date of Patent: Aug. 14, 2001

(54) IMAGE SENSOR MOUNTING SYSTEM

(75) Inventors: Robert J. Hennick, Auburn; Michael P. Lacey, Camillus; Robert C. Hinkley, Skaneateles; Melvin D. McCall, Homer, all of NY (US)

(73) Assignee: Welch Allyn Data Collection, Inc., Skaneateles Falls, NY (US)

( * ) Notice: Subject to any disclaimer, the term of this patent is extended or adjusted under 35 U.S.C. 154(b) by 0 days.

(21) Appl. No.: 09/112,028

(22) Filed: Jul. 8, 1998

(51) Int. Cl.[7] .................................................. H05K 7/14
(52) U.S. Cl. ........................ 361/807; 361/749; 361/808; 361/809; 439/77; 235/462.43
(58) Field of Search ............................. 361/807–810, 361/829, 749; 235/462.11, 462.41, 462.43; 348/373, 374; 250/239; 257/432–434, 444, 680, 684, 731; 396/542; 439/77

(56) References Cited

U.S. PATENT DOCUMENTS

| | | | |
|---|---|---|---|
| 4,488,679 | 12/1984 | Bockholt et al. | 235/469 |
| 4,570,057 | 2/1986 | Chadima, Jr. et al. | 235/462.45 |
| 4,743,773 | 5/1988 | Katana et al. | 235/462.07 |
| 4,832,003 | 5/1989 | Yabe | 600/109 |
| 4,953,539 | 9/1990 | Nakamura et al. | 600/109 |
| 5,210,406 | 5/1993 | Beran et al. | 250/221 |
| 5,331,176 | 7/1994 | Sant' Anselmo et al. | 250/566 |
| 5,378,883 | 1/1995 | Batterman et al. | 235/462.21 |
| 5,504,367 | 4/1996 | Arackellian et al. | 235/462.42 |
| 5,521,366 | 5/1996 | Wang et al. | 235/454 |
| 5,550,675 | 8/1996 | Komatsu | 359/514 |
| 5,598,007 | 1/1997 | Bunce et al. | 250/566 |
| 5,600,116 | 2/1997 | Seo et al. | 235/455 |
| 5,602,379 | 2/1997 | Uchimura et al. | 235/462.11 |
| 5,697,699 | 12/1997 | Seo et al. | 362/252 |
| 5,780,834 | * 7/1998 | Havens et al. | 235/462.1 |
| 5,923,032 | * 7/1999 | Carlson et al. | 250/239 |
| 6,035,147 | * 3/2000 | Kurosawa | 348/373 |

* cited by examiner

Primary Examiner—Jeffrey Gaffin
Assistant Examiner—John B. Vigushin
(74) Attorney, Agent, or Firm—Wall Marjama & Bilinski

(57) ABSTRACT

According to the invention, a multilayered image sensor is backmounted to a plate, and the plate in turn, is installed in a holding pocket of a device. In that the scheme takes advantage of a high controllability of a mounting plate's thickness, the mounting scheme provides for tight control of holding forces with which an image sensor is secured in an imaging device. In that the scheme provides for back mounting of image sensor on a planar surface, the mounting system provides tight control of an imaging assembly's pixel plane to fixed point in space distance.

45 Claims, 4 Drawing Sheets

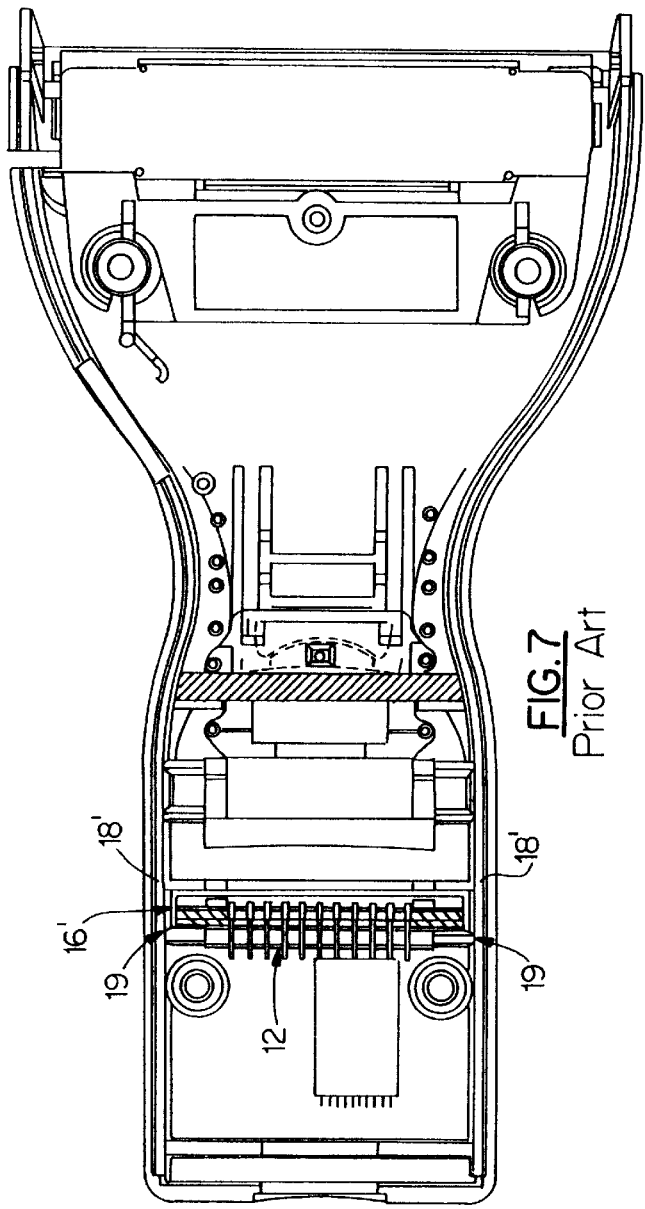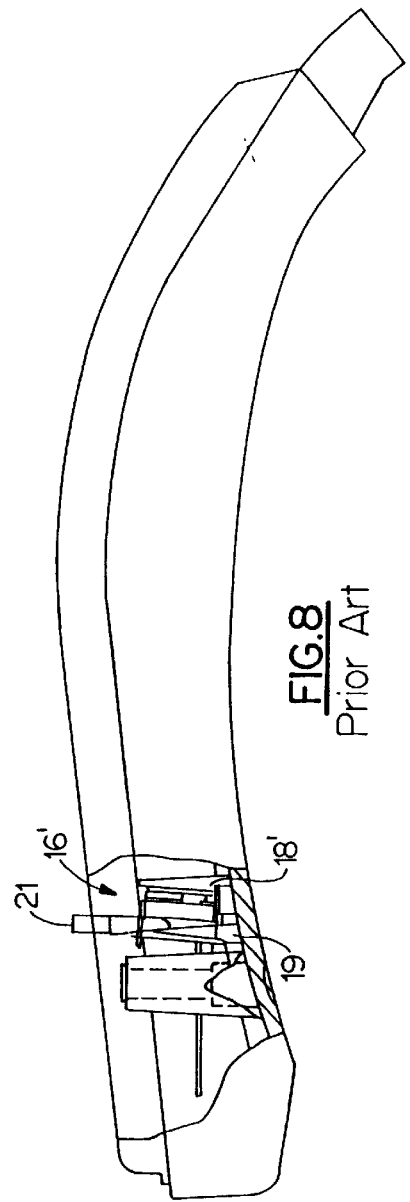

IMAGE SENSOR MOUNTING SYSTEM

BACKGROUND OF THE INVENTION

1. Field of the Invention

The present invention relates generally to a mounting system for mounting a structure whose thickness cannot be tightly controlled, and particularly to a mounting system for mounting an image sensor.

2. Background of the Prior Art

A typical image sensor chip 12 of the type mounted in various types of devices, such as medical instruments, video cameras, and bar code readers is shown in FIG. 6. The image sensor shown includes a bottom planar member 110 carrying a pixel array 112. Front and rear lead frames 114 initially extend peripherally from the pixel array and are formed to extend downwardly about front and rear edges respectively, of bottom planar member 110 terminating in pins 32. Image sensor 12 further includes top planar member 118 which rests against pixel array 112 and lead frame 114. Top planar member 118 is secured against lead frames 114 and against pixel plane 112 by the force of adhesive material interposed between top and bottom planar members 110 and 118. Adhesive material is disposed mainly about the periphery of pixel array 112. In addition, image sensor 12 may include a glass layer 120. In some popular models of image sensors, top planar member 118 is configured in the form of a frame which retains glass layer 120. Thus, it is seen that image sensor 12 is of a stacked-up configuration. Like most structures whose design is of a generally stacked up configuration, the thickness, t, of assembly 12 cannot be tightly controlled. In the manufacturing of sensor 12, the thickness of the various layers will vary from structure to structure. Accordingly, the total thickness, t, will vary from structure to structure. The spacing, s, between top and bottom planar members 110 and 118 of image sensor 12 is particularly difficult to control given that such spacing is a function of the amount of adhesive used, the thickness of pixel array 112 and the thickness of lead frames 114.

Particularly in applications where such an image sensor must be side mounted (not "plugged into" a PCB), as is the case with most bar code reader applications, then the inability to tightly control image sensor thickness, t, can negatively impact operational characteristics of the device in which the sensor is incorporated in. An explanation of how the inability to tightly control sensor thickness can impact operation of a bar code reader is made with reference to FIGS. 7 and 8 showing a multilayered image sensor incorporated in a bar code reader according to a prior art mounting scheme. In the mounting scheme shown, a multilayered image sensor 12 is disposed into a holding pocket 16 defined by substantially equally tensioned pairs of rear pins 19 and forward pins 18. The prior art mounting system may further include a spacer 21 for biasing sensor 12 forwardly against forward pins 18.

A number of operational problems can arise with this mounting scheme. If the thickness of the image sensor which is manufacturable to a thickness in the tolerance range from $T_{min}$ to $T_{max}$ tends toward $T_{min}$ then pins 18, 19 may not supply sufficient pressure to image sensor 12 to hold sensor 12 in a secure position. Further, it can be seen that the distance, d, from any fixed point in space, $P_s$, to any fixed point $P_p$, on the plane of pixel array 12 will vary depending on the total thickness, t, of sensor 12 which is a thickness having a high degree of variability. This is not preferred since controlling the distance, d, is important to controlling the operation of the reader.

There is a need for an image sensor mounting system for mounting an image sensor in an imaging device which minimizes operational problems resulting from the inability to tightly control an image sensor chip's thickness.

SUMMARY OF THE INVENTION

According to its major aspects and broadly stated the present invention is a mounting system for mounting an image sensor chip in a location in a device apart from a PCB board.

In one embodiment of the invention, a multilayered image sensor is backmounted to a plate, and the plate in turn, is installed in a holding pocket of a device. In that the scheme takes advantage of a high controllability of a mounting plate's thickness, the mounting scheme improves the consistency of holding forces with which several image sensors are secured in like configured imaging devices. In that the scheme provides for back mounting of image sensor on a plate, the mounting system reduces fluctuations in pixel plane to fixed point distances.

The mounting scheme may be enhanced by forming cutout sections in the mounting plate. The cutout sections serve to bench lead frames extending from an image sensor, and thereby serve to minimize sliding or twisting of an image sensor mounted on a mounting plate. In another enhancement, an image sensor mounted on a mounting plate is secured to the plate entirely by a compression force supplied by a flex strip, soldered onto an image sensor's lead frames, impinging on the mounting plate. This arrangement serves to further minimize thickness variations resulting from manufacturing tolerances.

In a variation of the invention, the mounting plate is substituted for by a back plate formed integral with a component frame of a device. The back plate along with the remainder of the frame define an elongated aperture adapted to receive a lead frame of an image sensor. An image sensor may be mounted to a back plate in essentially the same way that an image sensor is mounted to a mounting plate to the end that an image sensor is tightly secured in a device and further to the end that pixel plane to fixed point distance is tightly controlled.

These and other details, advantages and benefits of the present invention will become apparent from the detailed description of the preferred embodiment hereinbelow.

BRIEF DESCRIPTION OF THE DRAWINGS

The preferred embodiment of the invention will now be described, by way of example only, with reference to the accompanying Figures wherein like members bear like reference numerals and wherein:

FIG. 7 is a top view of a prior art optical reader illustrating a prior art image sensor mounting system;

FIG. 8 is a cross sectional side view of the reader shown in FIG. 7.

DETAILED DESCRIPTION OF THE PREFERRED EMBODIMENT

Figure 1:
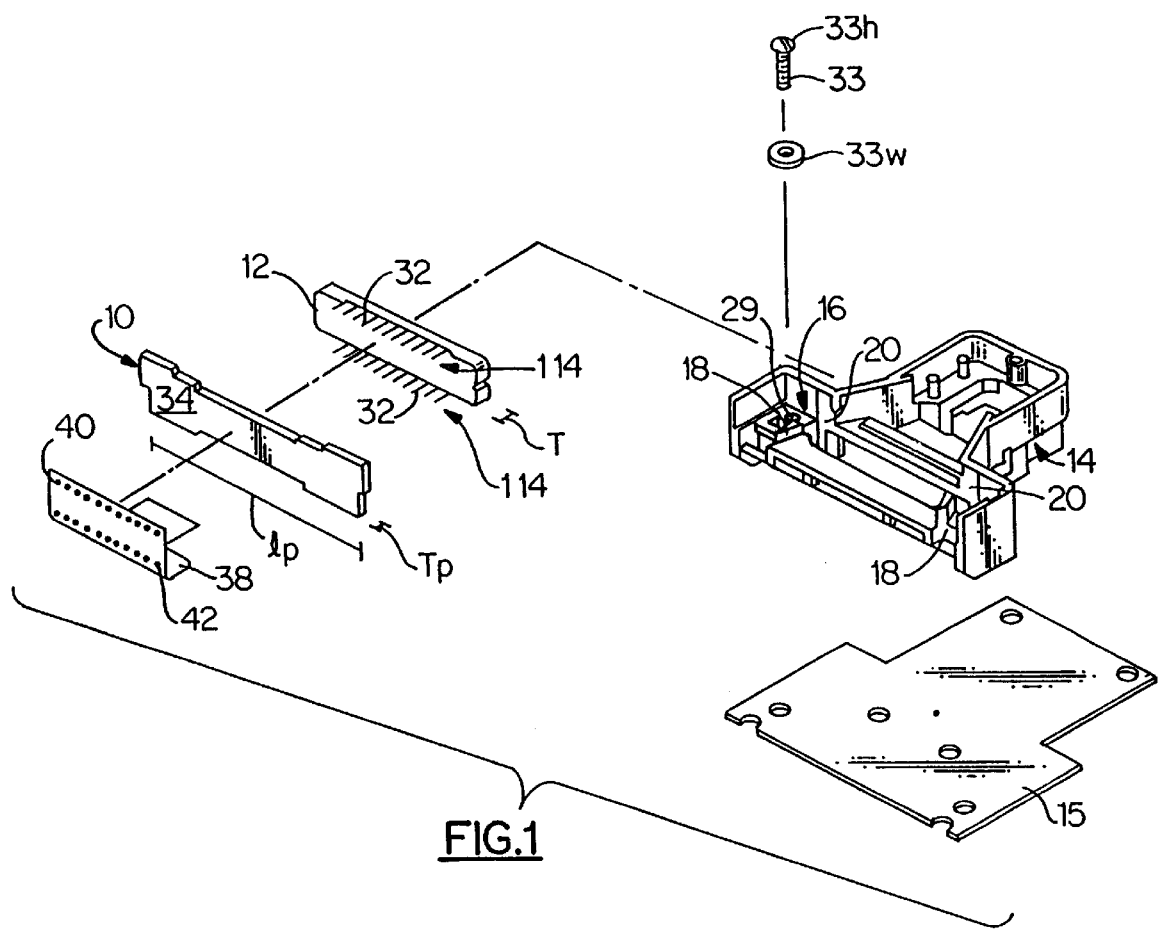
FIG. 1 is perspective assembly diagram illustrating assembly of a mounting system according to the invention.
Figure 2:
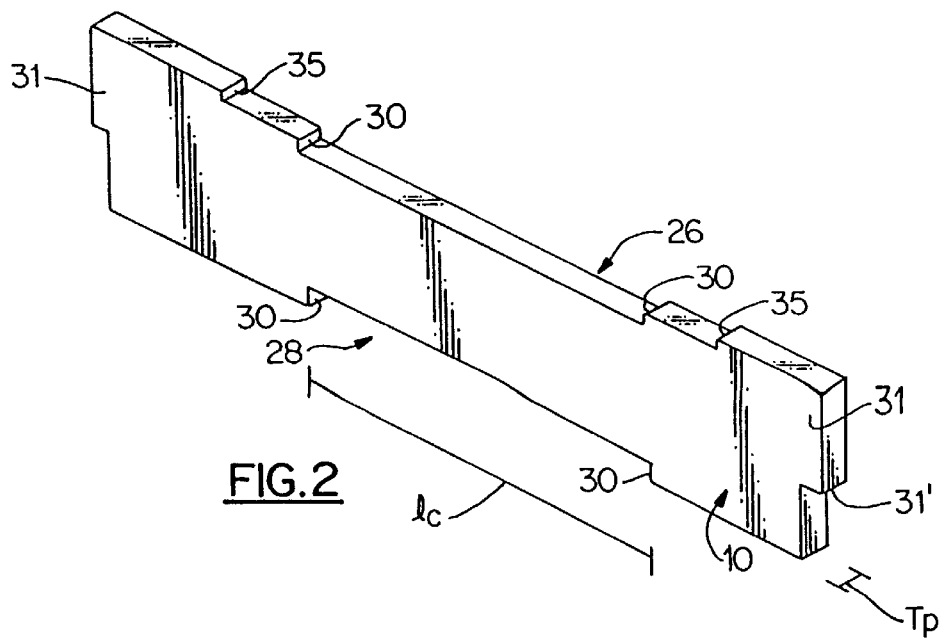
FIG. 2 is an enlarged perspective view of a mounting plate shown in FIG. 1.
Figure 3:
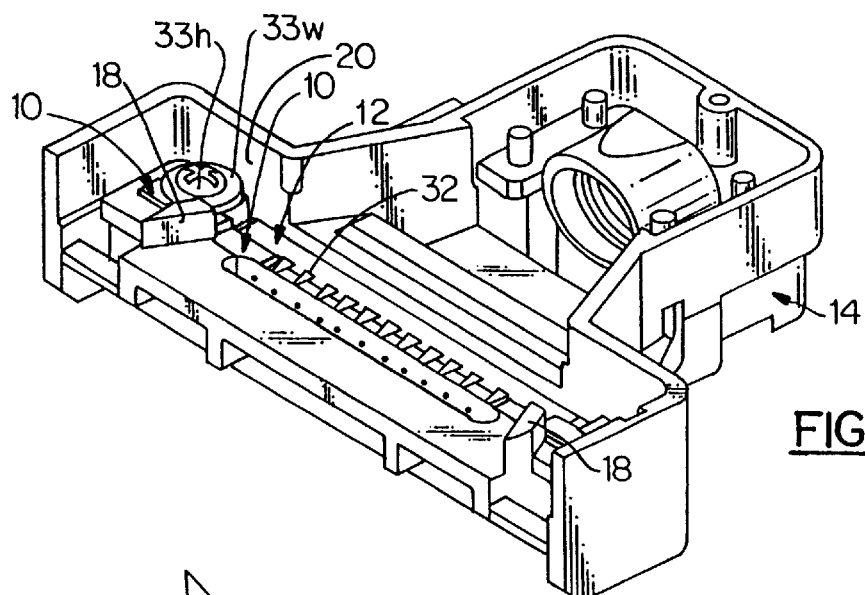
FIG. 3 is an enlarged perspective view of a component frame shown in FIG. 1.

An exemplary embodiment of an image sensor mounting system according to the invention is described with reference to the assembly drawing of FIG. 1. In this embodiment, a plate 10 is provided for back mounting an image sensor 12. In a simplified form of this mounting scheme, plate 10 is provided by a substantially rigid planar member comprising insulating material, image sensor 12 is mounted to plate 10 by any suitable means such as gluing or taping, and the resulting assembly comprising a plate and sensor 10 and 12 is mounted to an optical reader component frame 14 by inserting plate into a pocket 16 which may be defined, as is shown, by a pair of pins 18 and wall sections 20. Plate 10 is sized to a length $l_p$ such that the edges of plate 10 extend beyond the edges of sensor 12 when sensor is attached to plate 10 to the end that a pocket 16 can hold an image sensor in a secure position by applying lateral holding forces to plate 10 without supplying lateral forces to the top glass, or bottom planar members of image sensor 12.

Component frame 14 in the example provided is an optical assembly component frame. Optical assembly frames of optical readers are typically comprised of molded plastic and are typically adapted to carry various optical system components of an optical reader. In addition to carrying an image sensor 12, an optical assembly frame of an optical reader may carry such components as mirrors, lenses and illumination sources, such as LEDs. In most optical readers, an optical assembly component frame 14 is installed on a printed circuit board. e.g. circuit board 15 which, in addition to carrying frame 14, carries most, if not all, of the electrical components of the optical reader.

The mounting scheme described is advantageous over the prior art because it increases the security with which image sensor 12 is held in pocket 16 and furthermore, increases the precision with which a pixel plane to fixed point distance can be controlled.

While the total thickness, t, of stacked up image sensor 12 cannot be tightly controlled, the thickness $T_p$ of plate 10 can be tightly controlled. Accordingly, pockets 16 of several like designed optical assembly frames will apply relatively consistent holding forces to image sensors disposed therein.

The mounting system increases the precision with which pixel plane to fixed point distance, d, is controlled because it reduces the number of manufacturing tolerances which contribute to the distance, d, the distance between any fixed point, $P_p$, on the plane of a pixel array 12 and a fixed point, $P_s$, away from the pixel plane.

Figure 6:
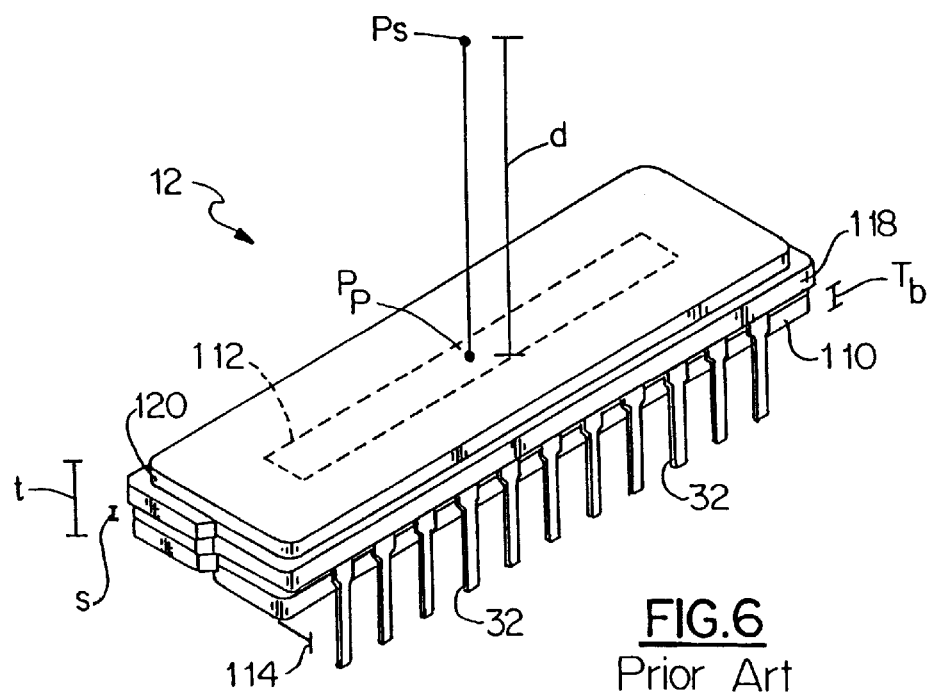
FIG. 6 is an exemplary perspective view of an image sensor chip illustrating a multilayered construction thereof.

In a prior art mounting system described with reference to FIGS. 6, 7 and 8, the pixel plane to fixed point distance, d, is a function of the total thickness, t, of an image sensor 10, which is a function of the highly variable top planar member to bottom planar member spacing, s.

Because a pixel plane of an image sensor 10 is disposed flush on a bottom planar member, it is seen that pixel plane to fixed point distance, d, in the mounting system of FIG. 1 is influenced only by the bottom plate thickness $t_b$, and the mounting plate thickness $t_p$, both of which can be tightly controlled.

Additional features can be incorporated in the mounting system thus far described for further improving the operation of the mounting system.

One enhancement to the mounting system thus far generally described is to form in mounting plate 10 first and second cutout sections 26 and 28. Cutout sections 26 and 28 defined by side walls 30 are sized to a length $l_c$ approximately the same length or slightly longer than lead frames 114 so that edges of lead frames 114 are benched on walls 30 when image sensor 10 is mounted on mounting plate 10. Cutout sections 26 and 28 provide the function of stabilizing the position of an image sensor on mounting plate 10 so as to prevent sliding or twisting of image sensor 12 on plate 10.

Another enhancement to the mounting system generally described relates to a mounting scheme for mounting an image sensor 12 to mounting plate 10. It has been mentioned herein that sensor 12 can be secured to plate 10 using any conventional securing means, such as adhesives, glues, double sided tapes, etc. However, such schemes for attachment have the potential drawback in that they add thickness to an assembly including an image sensor and a back plate.

In the image sensor to plate mounting scheme of FIG. 1 the mounting is accomplished without use of any thickness-adding material. As seen in FIG. 1, pins 32 will extend outwardly beyond the back surface 34 of plate 10 when sensor 12 is pressed flush against plate 10. A flex strip 38 which includes two strips 40 and 42 of pin receptacles for providing electrical connection between sensor leads 12 and certain electrical connectors of reader (normally on PCB), a distance away from sensor 12 may be attached to image sensor 12 such that a first row of pins 32 are received in a first row of receptacles 40 and a second row of pins 32 are received in a second row of receptacles 42 of flex strip 39. Pins 32 can be soldered onto receptacles 40 and 42 such that the compression force of flex strip 38 impinging on mounting plate 10 to bias plate 10 against sensor 12 is sufficient to hold sensor 12, securely on plate 10 without additional securing forces supplied by glues, tape, or other adhesive material.

In the mounting system of FIG. 1, plate 10 may further include side wall formations 31 which are received in complementary formations of pocket 16. In particular, the mounting system can be configured such that bottom surface 31' of formation 30 is received on a complementary surface of pocket 16. Furthermore, when plate 10 is installed in pocket 16, at least one screw 33 can be received in at least one hole 29 formed in pocket 16 in such a location that screw head 33h or associated washer 33w applies a vertical holding force to a received image sensor 12. In the particular embodiment shown, a cutaway section defined by walls 35 is provided so that plate 10 does not interfere with the receiving light optics in the particular optical system in the example provided.

Figure 4A:
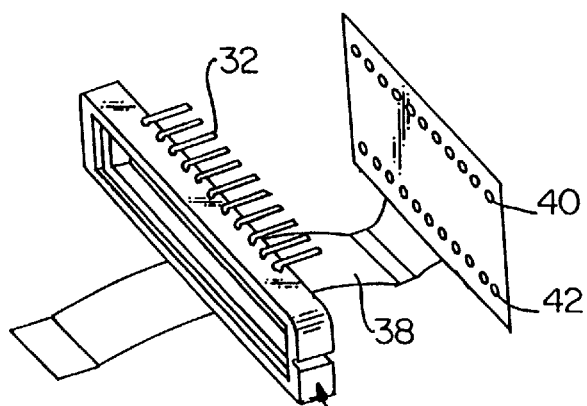
FIG. 4a is a perspective partial assembly diagram illustrating assembly of a flex strip onto an image sensor.
Figure 4B:
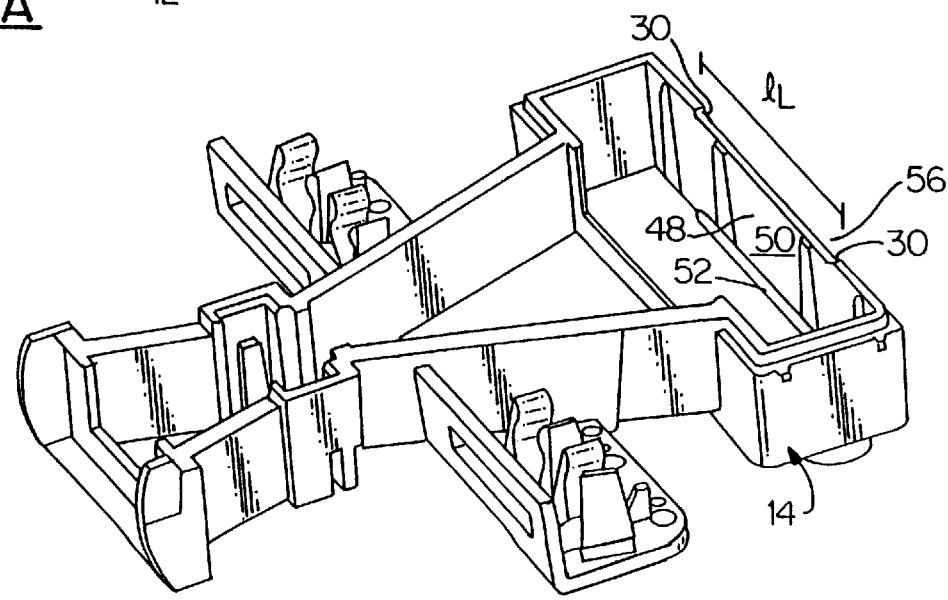
FIG. 4b is a perspective view illustrating an example of a component frame having an integrated back plate for receiving an image sensor.
Figure 5:
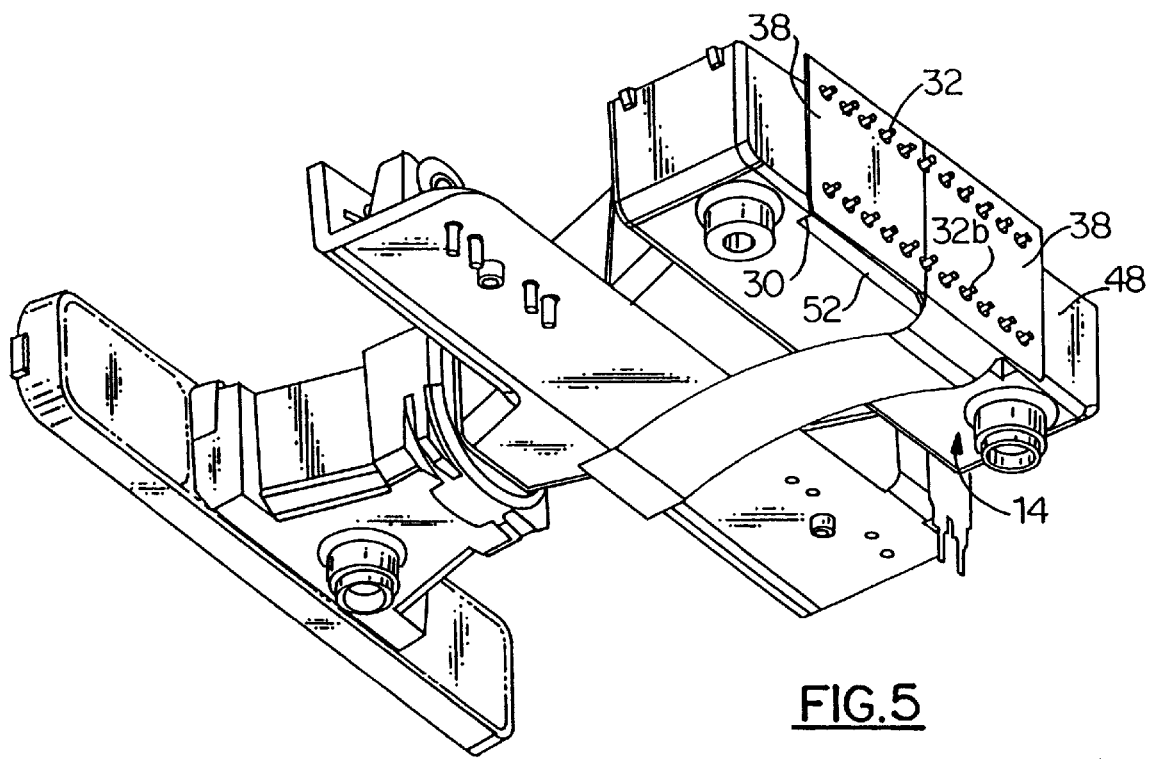
FIG. 5 a second perspective view of the component frame of FIG. 4b showing an image sensor installed thereon according to a mounting system of the invention.

A variation on the mounting schemes described thus far is described with reference to FIGS. 4a through FIG. 5. In the schemes described thus far, image sensor 12 is mounted to a plate 10 which, in turn, is received in a pocket 16 in an optical assembly frame 14 of a bar code reader.

In the mounting scheme described with reference to FIGS. 4a, 4b and 5, the mounting pocket 16 of optical assembly frame 14 is deleted, and optical assembly frame 14 instead is furnished with a back plate 48 integral with frame 14 which provides essentially the same function as mounting plate 10. Certain features of an optical system which may be incorporated in a frame of the type shown in FIG. 4b and FIG. 5 are described in detail in copending applications entitled "Optical Assembly for Barcode Scanner," Ser. No. 09/111,476 and "Adjustable Illumination System for a Barcode Scanner," Ser. No. 09/111,583 filed concurrently herewith, incorporated by reference herein, and assigned to the Assignee of the present invention.

In this mounting scheme, image sensor 12 is mounted directly to back plate 48 in essentially the same manner that sensor 12 is mounted to mounting plate 10 in the general scheme described previously.

In mounting sensor 12 to back plate 48 then sensor 12 is pressed against surface 50 of back plate 48. Frame 14 includes elongated aperture 52 defined by bottom edge of back plate 48 to accommodate bottom pins 32*b* of lead frame 114 when sensor 10 is mounted against back plate 48. Securing material such as glues tapes or other adhesives may be provided to aid in the securing of an image sensor against back plate 48. In the alternative, image sensor 12 may be secured to back plate 48 as described previously by a compression force supplied by flex strip 38, which when soldered, works to bias image sensor 12 against plate 48.

Cutout section 56 and aperture 52 can be sized to have lengths $l_c$ approximately equal to the respective lengths of lead frames 114 so that side wall 30 of aperture 52 and of cutaway section 56 operate to bench lead frames 114 and to thereby prevent sliding or twisting of image sensor 12 when image sensor 12 is mounted on back plate 48. It will be seen that a back plate of the invention can be provided by virtually any substantially planar rigid surface integrated onto a mounted component frame.

While the present invention has been particularly shown and described with reference to the preferred mode as illustrated in the drawing, it will be understood by one skilled in the art that various changes in detail may be effected therein without departing from the spirit and scope of the invention as defined by the claims.

What is claimed is:

1. A system for mounting an image sensor in a device, said system comprising:
    an insulating mounting plate, said image sensor being mounted on said mounting plate so that substantially an entire surface of said image sensor opposes said mounting plate, said mounting plate having edges extending extensively from said image sensor; and
    a holding pocket formed in said device, said mounting plate being deposited in said holding pocket so that said edges of said mounting plate engage said pocket.

2. The system of claim 1, wherein said pocket, in holding said image sensor, is adapted to supply lateral holding forces to said plate without supplying any substantial lateral holding forces to said image sensor.

3. The system of claim 1, wherein said pocket includes a pair of pins and pair of opposing wall sections.

4. The system of claim 1, wherein said pocket includes a pair of forward pins and a pair of opposing rear pins.

5. The system of claim 1, wherein said plate includes a cutaway section for accommodating a lead frame of said image sensor.

6. The system of claim 1, wherein said plate includes first and second cutout sections for accommodating first and second lead frames of said image sensor.

7. The system of claim 1, wherein said image sensor is mounted to said plate by a securing force supplied by an adhesive material.

8. The system of claim 1, wherein lead frames of said image sensor are disposed about said plate when said plate is in contact with said image sensor; and wherein said system further includes a flex strip attached to said lead frames such that said flex strip biases said image sensor toward said plate.

9. A device for use in capturing images, said device comprising:
    a component frame;
    a back plate formed on said frame;
    an aperture defined by said frame and said back plate;
    an image sensor including lead frames mounted to said back plate, said aperture accommodating one of said lead frames.

10. The device of claim 9, wherein said back plate includes a cutaway section for accommodating one of said lead frames of said image sensor.

11. The device of claim 9, wherein said image sensor is mounted to said back plate by a securing force supplied by an adhesive material.

12. The device of claim 9, wherein lead frames of said image sensor are disposed about said back plate when said plate is in contact with said image sensor; and wherein said system further includes a flex strip attached to said lead frames such that said flex strip biases said image sensor toward said back plate.

13. The device of claim 9, wherein said back plate is integral with said frame.

14. A method for installing an image sensor in a device for use in capturing images, said method comprising the steps of:
    providing a component frame having at least one rigid planar surface integral with said frame; and
    mounting said image sensor to said frame by biasing a substantially planar back surface of said image sensor toward said rigid planar surface.

15. The method of claim 14, wherein said mounting step includes the step of adhering a back of said image sensor on said at least one rigid planar surface.

16. The method of claim 14, wherein said mounting step includes the step of attaching a flex strip to said lead frames such that said flex strip biases said back surface toward said at least one rigid surface.

17. A system for mounting an image sensor in a device, said system comprising:
    a mounting plate, said image sensor being mounted on said mounting plate; and
    a holding pocket having a pair of forward pins and a pair of opposing rear pins formed in said device, said mounting plate being deposited in said holding pocket.

18. The system of claim 17, wherein said pocket, in holding said image sensor, is adapted to supply lateral holding forces to said plate without supplying any substantial lateral holding forces to said image sensor.

19. The system of claim 17, wherein said mounting plate consists essentially of insulating material.

20. The system of claim 17, wherein said plate includes a cutaway section for accommodating a lead frame of said image sensor.

21. The system of claim 17, wherein said plate includes first and second cutout sections for accommodating first and second lead frames of said image sensor.

22. The system of claim 17, wherein said image sensor is mounted to said plate by a securing force supplied by an adhesive material.

23. The system of claim 17, wherein lead frames of said image sensor are disposed about said plate when said plate is in contact with said image sensor; and wherein said system further includes a flex strip attached to said lead frames such that said flex strip biases said image sensor toward said plate.

24. A system for mounting an image sensor in a device, said system comprising:
   a mounting plate, said image sensor being mounted on said mounting plate, said mounting plate including a cutaway section for accommodating a lead frame of said image sensor; and
   a holding pocket formed in said device, said mounting plate being deposited in said holding pocket.

25. The system of claim 24, wherein said pocket, in holding said image sensor, is adapted to supply lateral holding forces to said plate without supplying any substantial lateral holding forces to said image sensor.

26. The system of claim 24, wherein said pocket includes a pair of pins and pair of opposing wall sections.

27. The system of claim 24, wherein said pocket includes a pair of forward pins and a pair of opposing rear pins.

28. The system of claim 24, wherein said mounting plate consists essentially of insulating material.

29. The system of claim 24, wherein said image sensor is mounted to said plate by a securing force supplied by an adhesive material.

30. The system of claim 24, wherein lead frames of said image sensor are disposed about said plate when said plate is in contact with said image sensor, and wherein said system further includes a flex strip attached to said lead frames such that said flex strip biases said image sensor toward said plate.

31. A system for mounting an image sensor in a device, said system comprising:
   a mounting plate, said image sensor being mounted on said mounting plate, said plate including first and second cutout sections for accommodating first and second lead frames of said image sensor; and
   a holding pocket formed in said device, said mounting plate being deposited in said holding pocket.

32. The system of claim 31, wherein said pocket, in holding said image sensor, is adapted to supply lateral holding forces to said plate without supplying any substantial lateral holding forces to said image sensor.

33. The system of claim 31, wherein said pocket includes a pair of pins and pair of opposing wall sections.

34. The system of claim 31, wherein said pocket includes a pair of forward pins and a pair of opposing rear pins.

35. The system of claim 31, wherein said plate consists essentially of insulating material.

36. The system of claim 31, wherein said plate includes first and second cutout sections for accommodating first and second lead frames of said image sensor.

37. The system of claim 31, wherein said image sensor is mounted to said plate by a securing force supplied by an adhesive material.

38. The system of claim 31, wherein lead frames of said image sensor are disposed about said plate when said plate is in contact with said image sensor; and
   wherein said system further includes a flex strip attached to said lead frames such that said flex strip biases said image sensor toward said plate.

39. A system for mounting an image sensor in a device, said system comprising:
   a mounting plate, said image sensor being mounted on said mounting plate; and
   a holding pocket formed in said device, said mounting plate being deposited in said holding pocket, wherein lead frames of said image sensor are disposed about said plate when said plate is in contact with said image sensor, and wherein said system further includes a flex strip attached to said lead frames such that said flex strip biases said image sensor toward said plate.

40. The system of claim 39, wherein said pocket, in holding said image sensor, is adapted to supply lateral holding forces to said plate without supplying any substantial lateral holding forces to said image sensor.

41. The system of claim 39, wherein said pocket includes a pair of pins and pair of opposing wall sections.

42. The system of claim 39, wherein said pocket includes a pair of forward pins and a pair of opposing rear pins.

43. The system of claim 39, wherein said plate includes a cutaway section for accommodating a lead frame of said image sensor.

44. The system of claim 39, wherein said plate includes first and second cutout sections for accommodating first and second lead frames of said image sensor.

45. The system of claim 39, wherein said image sensor is mounted to said plate by a securing force supplied by an adhesive material.

* * * * *